(12) United States Patent
German (10) Patent No.: US 8,477,333 B2
(45) Date of Patent: Jul. 2, 2013

(54) PRINTING SYSTEM AND BOTTLENECK OBVIATION THROUGH PRINT JOB SEQUENCING

(75) Inventor: Kristine A. German, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1845 days.

(21) Appl. No.: 11/341,733

(22) Filed: Jan. 27, 2006

(65) Prior Publication Data

US 2007/0177189 A1 Aug. 2, 2007

(51) Int. Cl.
*G06F 3/12* (2006.01)

(52) U.S. Cl.
USPC ........................................................ 358/1.15

(58) Field of Classification Search
None
See application file for complete search history.

(56) References Cited

U.S. PATENT DOCUMENTS

| | | | |
|---|---|---|---|
| 4,579,446 A | 4/1986 | Fujino et al. |
| 4,587,532 A | 5/1986 | Asano |
| 4,836,119 A | 6/1989 | Siraco et al. |
| 5,004,222 A | 4/1991 | Dobashi |
| 5,080,340 A | 1/1992 | Hacknauer et al. |
| 5,095,342 A | 3/1992 | Farrell et al. |
| 5,095,369 A | 3/1992 | Ortiz et al. |
| 5,159,395 A | 10/1992 | Farrell et al. |
| 5,208,640 A | 5/1993 | Horie et al. |
| 5,272,511 A | 12/1993 | Conrad et al. |
| 5,326,093 A | 7/1994 | Sollitt |
| 5,435,544 A | 7/1995 | Mandel |
| 5,473,419 A | 12/1995 | Russel et al. |
| 5,489,969 A | 2/1996 | Soler et al. |
| 5,504,568 A | 4/1996 | Saraswat et al. |
| 5,525,031 A | 6/1996 | Fox |
| 5,557,367 A | 9/1996 | Yang et al. |
| 5,568,246 A | 10/1996 | Keller et al. |
| 5,570,172 A | 10/1996 | Acquaviva |
| 5,596,416 A | 1/1997 | Barry et al. |
| 5,629,762 A | 5/1997 | Mahoney et al. |
| 5,696,893 A | 12/1997 | Fromhez et al. |
| 5,701,557 A | 12/1997 | Webster et al. |
| 5,710,968 A | 1/1998 | Clark et al. |
| 5,778,377 A | 7/1998 | Marlin et al. |
| 5,884,910 A | 3/1999 | Mandel |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner* — Jeremiah Bryar
(74) *Attorney, Agent, or Firm* — Fay Sharpe LLP (57) ABSTRACT

A printing system capable of processing a plurality of job streams and sub-jobs within a job stream. The system including one or more marking engines, a hopper, and one or more print media destinations. The system further provides a jobs scheduler for determining a schedule for processing queued print sub-jobs of a job stream using a utility function based on dwell time and a system model indicative of the plurality of interconnected processing units. The plurality of sub-jobs employing one or more of the plurality of sheet processing paths including at least one pre-print batch and at least one direct print batch. A sheet itineraries processor is provided for causing the plurality of interconnected processing units to concurrently move sheets of the concurrent sub-jobs along selected sheet processing paths to process the sheets and to deliver the at least one pre-print batch to the hopper and to deliver the at least one direct print batch to the destination.

19 Claims, 4 Drawing Sheets

U.S. PATENT DOCUMENTS

| | | | |
|---|---|---|---|
| 5,995,721 | A | 11/1999 | Rourke et al. |
| 6,059,284 | A | 5/2000 | Wolf et al. |
| 6,125,248 | A | 9/2000 | Moser |
| 6,241,242 | B1 | 6/2001 | Munro |
| 6,297,886 | B1 | 10/2001 | Cornell |
| 6,341,773 | B1 | 1/2002 | Aprato et al. |
| 6,384,918 | B1 | 5/2002 | Hubble, III et al. |
| 6,450,711 | B1 | 9/2002 | Conrow |
| 6,476,376 | B1 | 11/2002 | Biegelsen et al. |
| 6,476,923 | B1 | 11/2002 | Cornell |
| 6,493,098 | B1 | 12/2002 | Cornell |
| 6,537,910 | B1 | 3/2003 | Burke et al. |
| 6,550,762 | B2 | 4/2003 | Stoll |
| 6,554,276 | B2 | 4/2003 | Jackson et al. |
| 6,577,925 | B1 | 6/2003 | Fromherz |
| 6,607,320 | B2 | 8/2003 | Bobrow et al. |
| 6,608,988 | B2 | 8/2003 | Conrow |
| 6,612,566 | B2 | 9/2003 | Stoll |
| 6,612,571 | B2 | 9/2003 | Rider |
| 6,621,576 | B2 | 9/2003 | Tandon et al. |
| 6,633,382 | B2 | 10/2003 | Hubble, III et al. |
| 6,639,669 | B2 | 10/2003 | Hubble, III et al. |
| 6,819,906 | B1 | 11/2004 | Herrmann et al. |
| 6,856,411 | B1 | 2/2005 | Purvis et al. |
| 6,925,283 | B1* | 8/2005 | Mandel et al. ............... 399/388 |
| 6,959,165 | B2 | 10/2005 | Mandel et al. |
| 7,031,014 | B2* | 4/2006 | Ohwa ........................ 358/1.18 |
| 2002/0078012 | A1 | 6/2002 | Ryan et al. |
| 2002/0103559 | A1 | 8/2002 | Gartstein |
| 2003/0077095 | A1 | 4/2003 | Conrow |
| 2003/0184799 | A1* | 10/2003 | Ferlitsch ..................... 358/1.15 |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0150156 | A1 | 8/2004 | Fromherz et al. |
| 2004/0150158 | A1 | 8/2004 | Biegelsen et al. |
| 2004/0153983 | A1 | 8/2004 | McMillan |
| 2004/0216002 | A1 | 10/2004 | Fromherz et al. |
| 2004/0218212 | A1* | 11/2004 | Jang et al. .................. 358/1.15 |
| 2004/0225391 | A1 | 11/2004 | Fromherz et al. |
| 2004/0225394 | A1 | 11/2004 | Fromherz et al. |
| 2004/0247365 | A1 | 12/2004 | Lofthus et al. |

OTHER PUBLICATIONS

Desmond Fretz, "Cluster Printing Solution Announced", Today at Xerox (TAX), No. 1129, Aug. 3, 2001.
U.S. Appl. No. 10/761,522, filed Jan. 21, 2004, Mandel et al.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore et al.
U.S. Appl. No. 11/094,998, filed Mar. 31, 2005, Moore et al.
U.S. Appl. No. 11/094,864, filed Mar. 31, 2005, de Jong et al.
U.S. Appl. No. 11/095,872, filed Mar. 31, 2005, Julien et al.
U.S. Appl. No. 11/102,355, filed Apr. 8, 2005, Fromherz et al.
U.S. Appl. No. 11/084,280, filed Mar. 18, 2005, Mizes.
U.S. Appl. No. 11/109,566, filed Apr. 19, 2005, Mandel et al.
U.S. Appl. No. 11/109,558, filed Apr. 19, 2005, Furst et al.
U.S. Appl. No. 11/109,996, filed Apr. 20, 2005, Mongeon et al.
U.S. Appl. No. 11/093,229, filed Mar. 29, 2005, Julien.
U.S. Appl. No. 11/102,899, filed Apr. 8, 2005, Crawford et al.
U.S. Appl. No. 11/102,910, filed Apr. 8, 2005, Crawford et al.
U.S. Appl. No. 11/115,766, filed Apr. 27, 2005, Grace.
U.S. Appl. No. 11/102,332, filed Apr. 8, 2005, Hindi et al.
U.S. Appl. No. 11/136,959, filed May 25, 2005, German et al.
U.S. Appl. No. 11/122,420, filed May 5, 2005, Richards.
U.S. Appl. No. 11/137,634, filed May 25, 2005, Lofthus et al.
U.S. Appl. No. 11/137,251, filed May 25, 2005, Lofthus et al.
U.S. Appl. No. 11/137,273, filed May 25, 2005, Anderson et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,873, filed Jun. 30, 2005, Klassen.
U.S. Appl. No. 11/170,975, filed Jun. 30, 2005, Klassen.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/212,367, filed Aug. 26, 2005, Anderson et al.
U.S. Appl. No. 11/208,871, filed Aug. 22, 2005, Dalal et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/222,260, filed Sep. 8, 2005, Goodman et al.
U.S. Appl. No. 11/235,979, filed Sep. 27, 2005, Anderson et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/236,099, filed Sep. 27, 2005, Anderson et al.
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/274,638, filed Nov. 15, 2005, Wu et al.
U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/292,388, filed Nov. 30, 2005, Mueller.
U.S. Appl. No. 11/292,163, filed Nov. 30, 2005, Mandel et al.

* cited by examiner

PRINTING SYSTEM AND BOTTLENECK OBVIATION THROUGH PRINT JOB SEQUENCING

BACKGROUND

The example embodiments relate to the printing and marking arts. They particularly relate to printing systems with multiple processing units providing substantial degrees of freedom in performing print jobs, and to print job scheduling for such printing systems. However, the following relates more generally to printing and marking systems of all types, and to print job scheduling and bottleneck obviation for same.

Printing systems have generally been designed with a strong emphasis on ease of use, and a lesser emphasis on exploiting to the fullest the capabilities of the underlying printing hardware. Accordingly, the user is typically given a few pre-selected controls each having a limited number of pre-selected settings. For example, an image contrast control may have a "photo-optimized" setting, a "graphics-optimized" setting, and a "text-optimized" setting.

Additionally, printing systems have generally employed only one or a few sheet paths, and only one or a few print job destinations. For example, a typical printing system may have a single marking engine, which bottlenecks sheet processing down to a single print path. Even if multiple marking engines are provided, the print media conveyor may be configured to limit sheet processing to a single print path. In such an arrangement, the print jobs are queued and performed sequentially, in a first in-first out (FIFO) sequence.

Some more advanced printing systems provide multiple sheet paths and multiple job destinations. For example, a single job scheduler can be linked with two printing systems (tandem printing), or with three or more printing systems (cluster printing). FIFO print job queue/processing is typically employed; however, since multiple printing systems are linked to the job scheduler, the job scheduler can divide up sheets of a given job amongst two or more of the linked printing systems, so as to more efficiently process the print job. In tandem and cluster printing, each printing system is an independent printing system; accordingly, the sheets of a print job that is executed by two or more printing systems are manually collated or combined. FIFO print job queue/processing does not fully leverage the capabilities of multiple marking engines provided in tandem printing, cluster printing, and other parallel printing systems.

Integrated printing systems with multiple types of marking engines, such as color and black only engines, can assemble documents comprised of a mixture of the different IME type outputs. Productivity of such systems is optimal when documents to be assembled have a fairly uniform distribution of page types with the ratio of page type being roughly proportional to the productivity or capability of the IME types. However, severe productivity bottlenecks occur when the page type distributions within a sequence of consecutive pages of a job are substantially disproportionate from the production rate of the page types.

CROSS REFERENCE TO RELATED PATENTS AND APPLICATIONS

The following applications, the disclosures of each being totally incorporated herein by reference are mentioned:

application Ser. No. 11/212,367, filed Aug. 26, 2005, entitled "PRINTING SYSTEM," by David G. Anderson, et al., and claiming priority to U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES";

application Ser. No. 11/235,979, filed Sep. 27, 2005, entitled "PRINTING SYSTEM," by David G. Anderson, et al., and claiming priority to U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

application Ser. No. 11/236,099, filed Sep. 27, 2005, entitled "PRINTING SYSTEM," by David G. Anderson, et al., and claiming priority to U.S. Provisional Patent Application Ser. No. 60/631,918, Filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. application Ser. No. 10/785,211, filed Feb. 24, 2004, entitled "UNIVERSAL FLEXIBLE PLURAL PRINTER TO PLURAL FINISHER SHEET INTEGRATION SYSTEM," by Robert M. Lofthus, et al.;

U.S. application Ser. No. 10/881,619, filed Jun. 30, 2004, entitled "FLEXIBLE PAPER PATH USING MULTIDIRECTIONAL PATH MODULES," by Daniel G. Bobrow;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. application Ser. No. 10/917,768, filed Aug. 13, 2004, entitled "PARALLEL PRINTING ARCHITECTURE CONSISTING OF CONTAINERIZED IMAGE MARKING ENGINES AND MEDIA FEEDER MODULES," by Robert M. Lofthus, et al.;

U.S. application Ser. No. 10/924,106, filed Aug. 23, 2004, entitled "PRINTING SYSTEM WITH HORIZONTAL HIGHWAY AND SINGLE PASS DUPLEX," by Robert M. Lofthus, et al.;

U.S. application Ser. No. 10/924,113, filed Aug. 23, 2004, entitled "PRINTING SYSTEM WITH INVERTER DISPOSED FOR MEDIA VELOCITY BUFFERING AND REGISTRATION," by Joannes N. M. deJong, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. application Ser. No. 10/924,459, filed Aug. 23, 2004, entitled "PARALLEL PRINTING ARCHITECTURE USING IMAGE MARKING ENGINE MODULES (as amended)," by Barry P. Mandel, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 10/933,556, filed Sep. 3, 2004, entitled "SUBSTRATE INVERTER SYSTEMS AND METHODS," by Stan A. Spencer, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski, et al.;

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 10/999,450, filed Nov. 30, 2004, entitled "ADDRESSABLE FUSING FOR AN INTEGRATED PRINTING SYSTEM," by Robert M. Lofthus, et al.;

U.S. application Ser. No. 11/000,158, filed Nov. 30, 2004, entitled "GLOSSING SYSTEM FOR USE IN A TIPP ARCHITECTURE," by Bryan J. Roof;

U.S. application Ser. No. 11/000,168, filed Nov. 30, 2004, entitled "ADDRESSABLE FUSING AND HEATING METHODS AND APPARATUS," by David K. Biegelsen, et al.;

U.S. application Ser. No. 11/000,258, filed Nov. 30, 2004, entitled "GLOSSING SYSTEM FOR USE IN A TIPP ARCHITECTURE," by Bryan J. Roof;

U.S. Pat. No. 6,925,283, issued Aug. 2, 2005, entitled "HIGH PRINT RATE MERGING AND FINISHING SYSTEM FOR PARALLEL PRINTING," by Barry P. Mandel, et al.;

U.S. application Ser. No. 11/051,817, filed Feb. 4, 2005, entitled "PRINTING SYSTEMS," by Steven R. Moore, et al.;

U.S. application Ser. No. 11/069,020, filed Feb. 28, 2004, entitled "PRINTING SYSTEMS," by Robert M. Lofthus, et al.;

U.S. application Ser. No. 11/070,681, filed Mar. 2, 2005, entitled "GRAY BALANCE FOR A PRINTING SYSTEM OF MULTIPLE MARKING ENGINES," by R. Enrique Viturro, et al.;

U.S. application Ser. No. 11/081,473, filed Mar. 16, 2005, entitled "PRINTING SYSTEM," by Steven R. Moore;

U.S. application Ser. No. 11/084,280, filed Mar. 18, 2005, entitled "SYSTEMS AND METHODS FOR MEASURING UNIFORMITY IN IMAGES," by Howard Mizes;

U.S. application Ser. No. 11/089,854, filed Mar. 25, 2005, entitled "SHEET REGISTRATION WITHIN A MEDIA INVERTER," by Robert A. Clark, et al.;

U.S. application Ser. No. 11/090,498, filed Mar. 25, 2005, entitled "INVERTER WITH RETURN/BYPASS PAPER PATH," by Robert A. Clark;

U.S. application Ser. No. 11/090,502, filed Mar. 25, 2005, entitled IMAGE QUALITY CONTROL METHOD AND APPARATUS FOR MULTIPLE MARKING ENGINE SYSTEMS," by Michael C. Mongeon;

U.S. application Ser. No. 11/093,229, filed Mar. 29, 2005, entitled "PRINTING SYSTEM," by Paul C. Julien;

U.S. application Ser. No. 11/095,872, filed Mar. 31, 2005, entitled "PRINTING SYSTEM," by Paul C. Julien;

U.S. application Ser. No. 11/094,864, filed Mar. 31, 2005, entitled "PRINTING SYSTEM," by Jeremy C. dejong, et al.;

U.S. application Ser. No. 11/095,378, filed Mar. 31, 2005, entitled "IMAGE ON PAPER REGISTRATION ALIGNMENT," by Steven R. Moore, et al.;

U.S. application Ser. No. 11/094,998, filed Mar. 31, 2005, entitled "PARALLEL PRINTING ARCHITECTURE WITH PARALLEL HORIZONTAL PRINTING MODULES," by Steven R. Moore, et al.;

U.S. application Ser. No. 11/102,899, filed Apr. 8, 2005, entitled "SYNCHRONIZATION IN A DISTRIBUTED SYSTEM," by Lara S. Crawford, et al.;

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi;

U.S. application Ser. No. 11/109,558, filed Apr. 19, 2005, entitled "SYSTEMS AND METHODS FOR REDUCING IMAGE REGISTRATION ERRORS," by Michael R. Furst, et al.;

U.S. application Ser. No. 11/109,566, filed Apr. 19, 2005, entitled "MEDIA TRANSPORT SYSTEM," by Barry P. Mandel, et al.;

U.S. application Ser. No. 11/109,996, filed Apr. 20, 2005, entitled "PRINTING SYSTEMS," by Michael C. Mongeon, et al.;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/122,420, filed May 5, 2005, entitled "PRINTING SYSTEM AND SCHEDULING METHOD," by Austin L. Richards;

U.S. application Ser. No. 11/136,959, filed May 25, 2005, entitled "PRINTING SYSTEMS," by Kristine A. German, et al.;

U.S. application Ser. No. 11/137,634, filed May 25, 2005, entitled "PRINTING SYSTEM," by Robert M. Lofthus, et al.;

U.S. application Ser. No. 11/137,251, filed May 25, 2005, entitled "SCHEDULING SYSTEM," by Robert M. Lofthus, et al.;

U.S. C-I-P application Ser. No. 11/137,273, filed May 25, 2005, entitled "PRINTING SYSTEM," by David G. Anderson, et al.;

U.S. application Ser. No. 11/143,818, filed Jun. 2, 2005, entitled "INTER-SEPARATION DECORRELATOR," by Edul N. Dalal, et al.;

U.S. application Ser. No. 11/146,665, filed Jun. 7, 2005, entitled "LOW COST ADJUSTMENT METHOD FOR PRINTING SYSTEMS," by Michael C. Mongeon;

U.S. application Ser. No. 11/152,275, filed Jun. 14, 2005, entitled "WARM-UP OF MULTIPLE INTEGRATED MARKING ENGINES," by Bryan J. Roof, et al.;

U.S. application Ser. No. 11/156,778, filed Jun. 20, 2005, entitled "PRINTING PLATFORM," by Joseph A. Swift;

U.S. application Ser. No. 11/157,598, filed Jun. 21, 2005, entitled "METHOD OF ORDERING JOB QUEUE OF MARKING SYSTEMS," by Neil A. Frankel;

U.S. application Ser. No. 11/166,460, filed Jun. 24, 2005, entitled "GLOSSING SUBSYSTEM FOR A PRINTING DEVICE," by Bryan J. Roof, et al.;

U.S. application Ser. No. 11/166,581, filed Jun. 24, 2005, entitled "MIXED OUTPUT PRINT CONTROL METHOD AND SYSTEM," by Joseph H. Lang, et al.;

U.S. application Ser. No. 11/166,299, filed Jun. 24, 2005, entitled "PRINTING SYSTEM," by Steven R. Moore;

U.S. application Ser. No. 11/170,975, filed Jun. 30, 2005, entitled "METHOD AND SYSTEM FOR PROCESSING SCANNED PATCHES FOR USE IN IMAGING DEVICE CALIBRATION," by R. Victor Klassen;

U.S. application Ser. No. 11/170,873, filed Jun. 30, 2005, entitled "COLOR CHARACTERIZATION OR CALIBRATION TARGETS WITH NOISE-DEPENDENT PATCH SIZE OR NUMBER," by R. Victor Klassen;

U.S. application Ser. No. 11/170,845, filed Jun. 30, 2005, entitled "HIGH AVAILABILITY PRINTING SYSTEMS," by Meera Sampath, et al.;

U.S. application Ser. No. 11/189,371, filed Jul. 26, 2005, entitled "PRINTING SYSTEM," by Steven R. Moore, et al.;

U.S. application Ser. No. 11/208,871, filed Aug. 22, 2005, entitled "MODULAR MARKING ARCHITECTURE FOR WIDE MEDIA PRINTING PLATFORM," by Edul N. Dalal, et al.;

U.S. application Ser. No. 11/215,791, filed Aug. 30, 2005, entitled "CONSUMABLE SELECTION IN A PRINTING SYSTEM," by Eric Hamby, et al.;

U.S. application Ser. No. 11/222,260, filed Sep. 8, 2005, entitled "METHOD AND SYSTEMS FOR DETERMINING BANDING COMPENSATION PARAMETERS IN PRINTING SYSTEMS," by Goodman, et al.;

U.S. application Ser. No. 11/234,553, filed Sep. 23, 2005, entitled "MAXIMUM GAMUT STRATEGY FOR THE PRINTING SYSTEMS," by Michael C. Mongeon;

U.S. application Ser. No. 11/234,468, filed Sep. 23, 2005, entitled "PRINTING SYSTEM," by Eric Hamby, et al.;

U.S. application Ser. No. 11/247,778, filed Oct. 11, 2005, entitled "PRINTING SYSTEM WITH BALANCED CONSUMABLE USAGE," by Charles Radulski, et al.;

U.S. application Ser. No. 11/248,044, filed Oct. 12, 2005, entitled "MEDIA PATH CROSSOVER FOR PRINTING SYSTEM," by Stan A. Spencer, et al.; and U.S. application Ser. No. 11/274,638, filed Nov. 15, 2005, entitled "GAMUT SELECTION IN MULTI-ENGINE SYSTEMS," by Wencheng Wu, et al.;

U.S. application Ser. No. 11/287,177, filed Nov. 23, 2005, entitled "MEDIA PASS THROUGH MODE FOR MULTI-ENGINE SYSTEM," by Barry P. Mandel, et al.;

U.S. application Ser. No. 11/287,685, filed Nov. 28, 2005, entitled "MULTIPLE IOT PPHOTORECEPTOR BELT SEAM SYNCHRONIZATION," by Kevin M. Carolan;

U.S. application Ser. No. 11/291,860, filed Nov. 30, 2005, entitled "MEDIA PATH CROSSOVER CLEARANCE FOR PRINTING SYSTEM," by Keith L. Willis;

U.S. application Ser. No. 11/292,388, filed Nov. 30, 2005, entitled "PRINTING SYSTEM," by David A. Mueller;

U.S. application Ser. No. 11/292,163, filed Nov. 30, 2005, entitled "RADIAL MERGE MODULE FOR PRINTING SYSTEM," by Barry P. Mandel, et al.;

U.S. application Ser. No. 11/291,583, filed Nov. 30, 2005, entitled "MIXED OUTPUT PRINTING SYSTEM," by Joseph H. Lang;

U.S. application Ser. No. 11/312,081, filed Dec. 20, 2005, entitled "PRINTING SYSTEM ARCHITECTURE WITH CENTER CROSS-OVER AND INTERPOSER BY-PASS PATH," by Barry P. Mandel, et al.;

U.S. application Ser. No. 11/314,828, filed Dec. 21, 2005, entitled "MEDIA PATH DIAGNOSTICS WITH HYPER MODULE ELEMENTS," by David G. Anderson, et al;

U.S. application Ser. No. 11/314,774, filed Dec. 21, 2005, entitled "A METHOD AND APPARATUS FOR MULTIPLE PRINTER CALIBRATION USING COMPROMISE AIM," by R. Victor Klassen;

U.S. application Ser. No. 11/317,589, filed Dec. 23, 2005, entitled "UNIVERSAL VARIABLE PITCH INTERFACE INTERCONNECTING FIXED PITCH SHEET PROCESSING MACHINES," by David K. Biegelsen, et al.;

U.S. application Ser. No. 11/317,167, filed Dec. 23, 2005, entitled "PRINTING SYSTEM," by Robert M. Lofthus, et al.;

U.S. application Ser. No. 11/331,627, filed Jan. 13, 2006, entitled "PRINTING SYSTEM INVERTER APPARATUS", by Steven R. Moore.

REFERENCES

The following references, the disclosures of which are incorporated by reference relate generally to scheduling in a printing system:

U.S. Pat. No. 5,095,369 to Ortiz, et al. discloses a method for enhancing productivity in an electronic printer incorporating finishing activities and operating in a job streaming mode. Printing and collating of sets of original scanned documents are controlled so that collated sets are successively presented by the printer to the finisher nearly coincident with conclusion of the finishing activity being accomplished for a current job. The system uses a predictive algorithm which is used to increase reliability of printer components by cycling down the printer between jobs in situations where the finishing activity for a current job requires an extraordinarily long time to complete compared with the cycle down/cycle up time of the printer.

U.S. Pat. No. 5,701,557 to Webster, et al. describes an image processing apparatus with a controller and plural modules and a method to define a configuration of the image processing machine.

U.S. Pat. No. 6,856,411 to Purvis, et al. discloses a scheduler for picking an itinerary in a printing machine to schedule the processing of sheets through several modules of the printing machine. The scheduler uses hard "must have" policies and soft "desired" policies to select an itinerary.

U.S. Pat. No. 5,696,893 to Fromherz, et al. describes a method for modeling a printing machine specifying a structure model with its physical and software interface and internal resource requirements, and a behavior model to describe capabilities of a component with its description of work units, transformation of work units, timed events, resource allocations, constraints and restrictions.

U.S. application Ser. No. 10/924,458 filed Aug. 23, 2004 entitled PRINT SEQUENCE SCHEDULING FOR RELIABILITY, by Robert M. Lofthus, et al. discloses a scheduler for a printing system including a plurality of printers which schedules a sequence for printing a plurality of print jobs by the printers based on minimizing printer downtime or maximizing continuous printer run time.

U.S. application Ser. No. 11/137,634, filed May 25, 2005 entitled "PRINTING SYSTEM," by Robert M. Lofthus, et al., discloses a scheduler for a printing system including a plurality of processing units wherein the system model indicates characteristics of each processing unit. Received print jobs are scheduled for processing via one or more job streams by optimizing a utility function that is dependent upon user selected parameters, the job schedule, and the system model.

The following references, the disclosures of which are incorporated by reference in their entireties, relate to what have been variously called "tandem engine" printers, "parallel" printers, or "cluster printing" (in which an electronic print job may be split up for distributed higher productivity printing by different printers, such as separate printing of the color and monochrome pages), and "output merger" or "interposer" systems: U.S. Pat. Nos. 5,568,246 to Keller, et al., 4,587,532 to Asano, 5,570,172 to Acquaviva, 5,596,416 to Barry, et al.; 5,995,721 to Rourke et al; 4,579,446 to Fujino; 5,489,969 to Soler, et al.; a 1991 "Xerox Disclosure Journal" publication of November-December 1991, Vol. 16, No. 6, pp.

381-383 by Paul F. Morgan; and a Xerox Aug. 3, 2001 "TAX" publication product announcement entitled "Cluster Printing Solution Announced."

BRIEF DESCRIPTION

Aspects of the present disclosure in embodiments thereof include apparatus and method embodiments. The apparatus may include a printing system capable of processing a plurality of job streams and sub-jobs within a job stream. The system including one or more marking engines, a hopper, and multiple print media destinations. The system further provides a jobs scheduler for determining a schedule for processing queued print sub-jobs of a job stream using a utility function based on dwell time and a system model indicative of the plurality of interconnected processing units. The plurality of sub-jobs employing one or more of the plurality of sheet processing paths including at least one pre-print batch and at least one direct print batch. A sheet itineraries processor is provided for causing the plurality of interconnected processing units to concurrently move sheets of the concurrent sub-jobs along selected sheet processing paths to process the sheets and to deliver the at least one pre-print batch to the hopper and to deliver the at least one direct print batch to the destination.

The printing method may include determining a plurality of sub-jobs within a job stream, each sub-job having a consecutive sheet segment with disproportional page type and a dwell time and maintaining a system model of a printing system including a plurality of interconnected processing units, the system model indicating characteristics of each processing unit. The method further includes scheduling the plurality of sub-jobs for processing into direct print and pre-print batches and processing the direct print and pre-print batches using the plurality of interconnected processing units whereby at least one pre-print batch is staged in a hopper and at least one direct print batch is transported to a destination. And sequencing the sub-jobs whereby at least one pre-print batch is transferred in its entirety to the destination.

The printing method may include determining a plurality of sub-jobs within a job stream, each sub-job having a consecutive sheet segment with disproportional page type and a dwell time. The method further includes maintaining a system model of a printing system including a plurality of interconnected processing units, the system model indicating characteristics of each processing unit and scheduling the plurality sub-jobs for processing into direct print and pre-print batches. The method further provides for processing the direct print and pre-print batches using the plurality of interconnected processing units whereby at least one pre-print batch is staged in a hopper and at least one direct print batch is transported to a destination and sequencing the sub-jobs whereby at least a selected one of the sub-jobs is processed as both a pre-print batch and a direct print batch.

DETAILED DESCRIPTION

Figure 1:
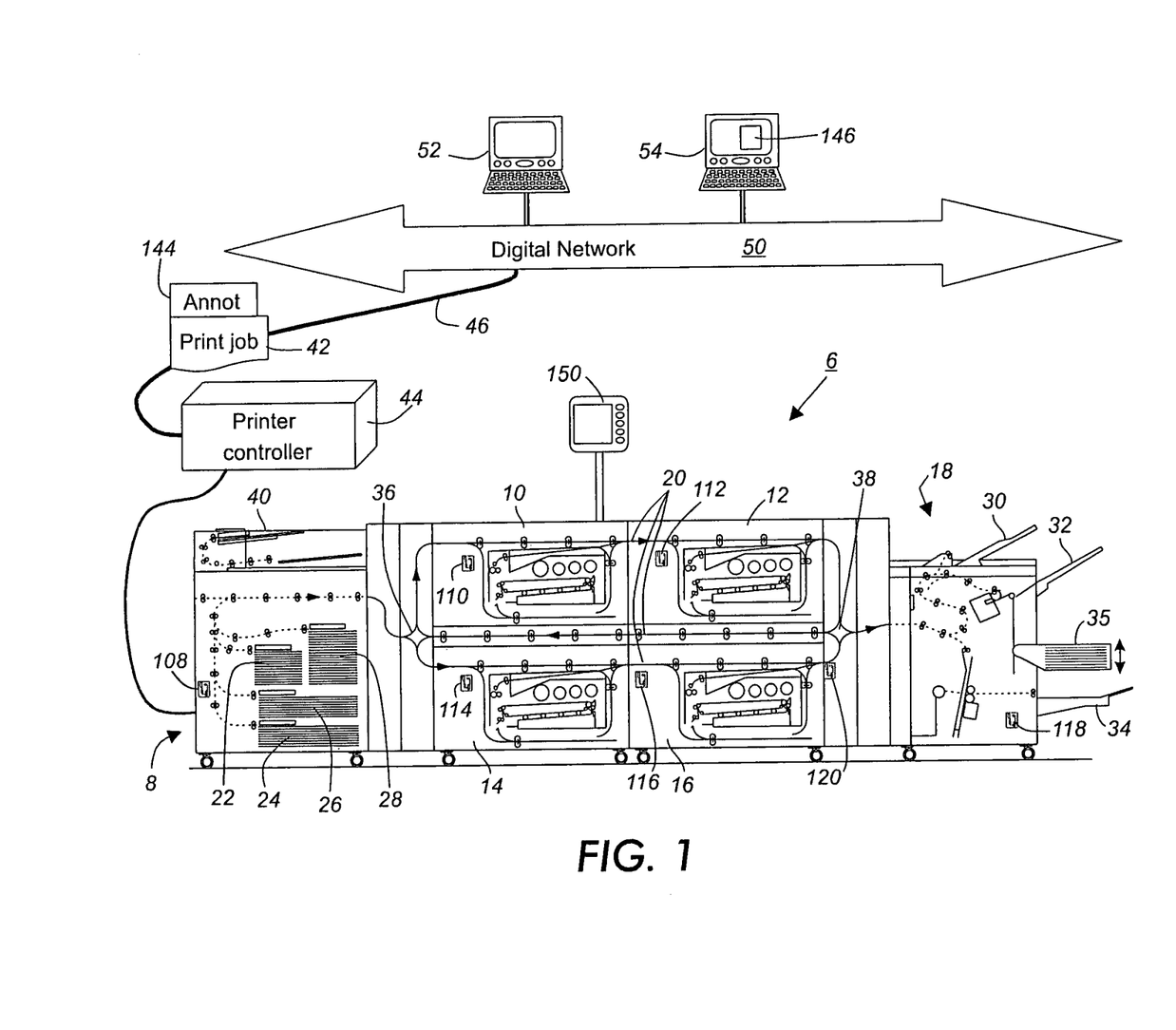
FIG. 1 diagrammatically illustrates an example printing system.

With reference to FIG. 1, an example printing system 6 is a modular printing system including processing units 8, 10, 12, 14, 16, 18 interconnected by a print media conveyer processing unit 20. While seven processing units are illustrated, the number of processing units may include one, two, three, four, five, six, seven, eight, or more processing units. In some embodiments, one or more of the processing units 8, 10, 12, 14, 16, 18, 20 are removable processing units. It is to be appreciated that the functional portion of a processing unit can be removed, leaving only the external housing or mounting fixture through which the print media conveyor 20 passes. In this manner, for example, the functional portion can be removed for repair, or can be replaced to effectuate an upgrade or modification of the printing system 6. The printing system 6 remains operational with the functional portion of a processing unit removed, broken, or otherwise unavailable, albeit with loss of the functionality of the processing unit.

In the printing system 6, the presently installed processing units 10, 12, 14, 16 are marking engines (i.e. xerographic). While four marking engines 10, 12, 14, 16 are illustrated, the number of marking engines can be one, two, three, four, five, or more. Providing at least two marking engines typically provides enhanced features and capabilities for the printing system, since marking tasks can be distributed amongst the at least two marking engines. Some or all of the marking engines 10, 12, 14, 16 may be identical to provide redundancy or improved productivity through parallel printing. Alternatively or additionally, some or all of the marking engines 10, 12, 14, 16 may be different to provide different capabilities. For example, the marking engines 10, 12 may be color marking engines, while the marking engines 14, 16 may be black (K) marking engines.

The illustrated marking engines 10, 12, 14, 16 employ xerographic printing technology, in which an electrostatic image is formed and coated with a toner material, and then transferred and fused to paper or another print medium by application of heat and pressure. However, marking engines employing other printing technologies can be provided as processing units, such as marking engines employing ink jet transfer, thermal impact printing, or so forth. The processing units of the printing system 6 can also be other than marking engines; for example, the processing unit 8 is a print media source processing unit that supplies paper or other print media for printing. The processing unit 18 is a finisher that provides finishing capabilities such as collation, stapling, staging, holding, sequencing, folding, stacking, hole-punching, binding, postage stamping, or so forth.

The print media source processing unit 8 includes print media sources 22, 24, 26, 28 connected with the print media conveyor 20 to provide selected types of print media. While four print media sources are illustrated, the number of print media sources can be one, two, three, four, five, or more. Moreover, while the illustrated print media sources 22, 24, 26, 28 are embodied as components of the dedicated print media source processing unit 8, in other embodiments one or more of the marking engines may include its own dedicated print media source instead of or in addition to those of the print media source processing unit 8. Each of the print media sources 22, 24, 26, 28 can store sheets of the same type of print medium, or can store different types of print media. For example, the print media sources 24, 26 may store the same type of large-size paper sheets, print media source 22 may store company letterhead paper, and the print media source 28 may store letter-size paper. The print media can be substantially any type of medium upon which one or more of the marking engines 10, 12, 14, 16 can print, such as: high quality bond paper, lower quality "copy" paper, overhead transparency sheets, high gloss paper, and so forth.

The print media conveyor 20 is controllable to acquire sheets of a selected print medium from the print media sources 22, 24, 26, 28, transfer each acquired sheet to one or more of the marking engine processing units 10, 12, 14, 16 to perform selected marking tasks, transfer each sheet to the finisher 18 to perform finishing tasks. The finisher unit 18 includes multiple print media destinations 30, 32, 34; while three destinations are illustrated, the printing system 6 may include two, three, four, or more print media destinations. The finisher 18 can also include a stager or inserter hopper 35 for holding or staging a batch of media sheets to be inserted in a job sequence at one of the print media destinations. That is, the multiple destinations may include two destinations, three destinations, four destinations, or more destinations. The finisher unit 18 deposits each sheet after processing in the print media destinations 30, 32, 34, and/or hopper 35 which may be trays, pans, or so forth.

The print media conveyor 20 passes through each intermediate processing unit 10, 12, 14, 16 to provide a bypass route by which the sheets can pass through the processing unit without interacting therewith. Branch paths are also provided in each processing unit 10, 12, 14, 16 to take the sheet off the conveyor 20 and into the functional portion of the processing unit and to deliver the processed sheet back to the conveyor 20. In the processing unit 16, the branch paths are presently removed along with the functional portion; however, the bypass portion of the conveyor 20 remains in the processing unit 16 so as to maintain continuity of the print media conveyor 20. The conveyor 20 may also include other branch junction points such as the example branch junction points 36, 38 to enable the conveyor to pass sheets along selected paths in the illustrated multiple-path conveyor configuration. This enables the illustrated arrangement in which the marking engine processing units 10, 12, 14, 16 are arranged two-dimensionally. In a linear arrangement of processing units (not illustrated), the branch junction points 36, 38 are suitably omitted.

The printing system 6 executes print jobs. Print job execution involves printing selected text, line graphics, images, machine ink character recognition (MICR) notation, or so forth on front, back, or front and back sides or pages of one or more sheets of paper or other print media. In general, some sheets may be left completely blank. In general, some sheets may have mixed color and black-and-white printing. Execution of the print job may also involve sequencing the sheets in a certain order. Further, the print job may include holding/staging a stack or batch of media sheets, to be inserted into a direct print job, as a 'pre-print sub-job'. Still further, the print job may include folding, stapling, punching holes into, or otherwise physically manipulating or binding the sheets. The printing, finishing, paper handing, and other processing operations that can be executed by the printing system 6 are determined by the capabilities of the processing units 8, 10, 12, 14, 16, 18, 20 and destination units 30, 32, 34, 35 of the printing system 6. Those capabilities may increase over time due to addition of new processing units or upgrading of existing processing units. Those capabilities may also decrease over time due to failure or removal of one or more processing units.

Print jobs can be supplied to the printing system 6 in various ways. A built-in optical scanner 40 can be used to scan a document such as book pages, a stack of printed pages, or so forth, to create a digital image of the scanned document that is reproduced by printing operations performed by the printing system 6. Alternatively, a print job 42 can be electronically delivered to a printing controller 44 of the printing system 6 via a wired connection 46 to a digital network 50 that interconnects example computers 52, 54 or other digital devices. For example, a network user operating word processing software running on the computer 54 may select to print the word processing document on the printing system 6, thus generating the print job 42, or an external scanner (not shown) connected to the network 50 may provide the print job in electronic form. While a wired network connection 46 is illustrated, a wireless network connection or other wireless communication pathway may be used instead or additionally to connect the printing system 6 with the digital network 50. The digital network 50 can be a local area network such as a wired Ethernet, a wireless local area network (WLAN), the Internet, some combination thereof, or so forth. Moreover, it is contemplated to deliver print jobs to the printing system 6 in other ways, such as by using an optical disk reader (not illustrated) built into the printing system 6, or using a dedicated computer connected only to the printing system 6.

The printing system 6 is an illustrative example of a parallel printing system. In general, any number of print media sources, media handlers, marking engines, collators, finishers or other processing units can be connected together by a suitable print media conveyor configuration. While the printing system 6 illustrates a 2×2 configuration of four marking engine processing units 10, 12, 14, 16, buttressed by the media source unit 8 on one end and by the finisher unit 18 on the other end, other physical layouts can be used, such as an entirely horizontal arrangement, stacking of processing units three or more units high, or so forth. Moreover, while in the printing system 6 the marking engine processing units 10, 12, 14, 16 have removable functional portions, in some other embodiments some or all processing units may have non-removable functional portions. It will be appreciated that even if the functional portion is non-removable, the provision of the print media conveyor 20 with bypass paths through each intermediate processing unit enables the processing unit to be taken "off-line" for repair or modification while the remaining processing units of the printing system continue to function as usual.

In some embodiments, separate bypasses for intermediate components may be omitted. The "bypass path" of the conveyor in such configurations suitably passes through the functional portion of a processing unit, and optional bypassing of the processing unit is effectuated by conveying the sheet through the functional portion without performing any processing operations. While the illustrated printing system 6 includes a complex paper handler in the form of the print media conveyor 20, in other embodiments simpler paper handlers can be used. Still further, in some embodiments the parallel printing system may be a tandem or cluster of networked or otherwise logically interconnected printing systems each having its own associated print media source and finishing components. The job scheduling methods and apparatuses disclosed herein are readily applied to substantially any parallel printing system which provides for processing of multiple job streams using sheet processing paths which can concurrently process two or more sheets.

The plurality of processing units 8, 10, 12, 14, 16, 18, 20 enables the parallel printing system 6 to have a large number of capabilities and features. Each marking engine 10, 12, 14, 16 for example, has associated low-level print settings such as xerographic voltages, fuser temperatures, toner reproduction curves, and so forth. Some of these low-level print settings are optionally modified depending upon the sequence along which a given sheet passes through the printing system 6; for example, it may be advantageous to modify the fusing temperatures of serially performed xerographic processes. At a higher functional level, each marking engine has associated functional parameters such as contrast, resolution, and so forth. Similarly, tandem and cluster printing systems provide a multiplicity of capabilities by providing multiple marking engines, paper handlers, finishers, and so forth.

Figure 2:
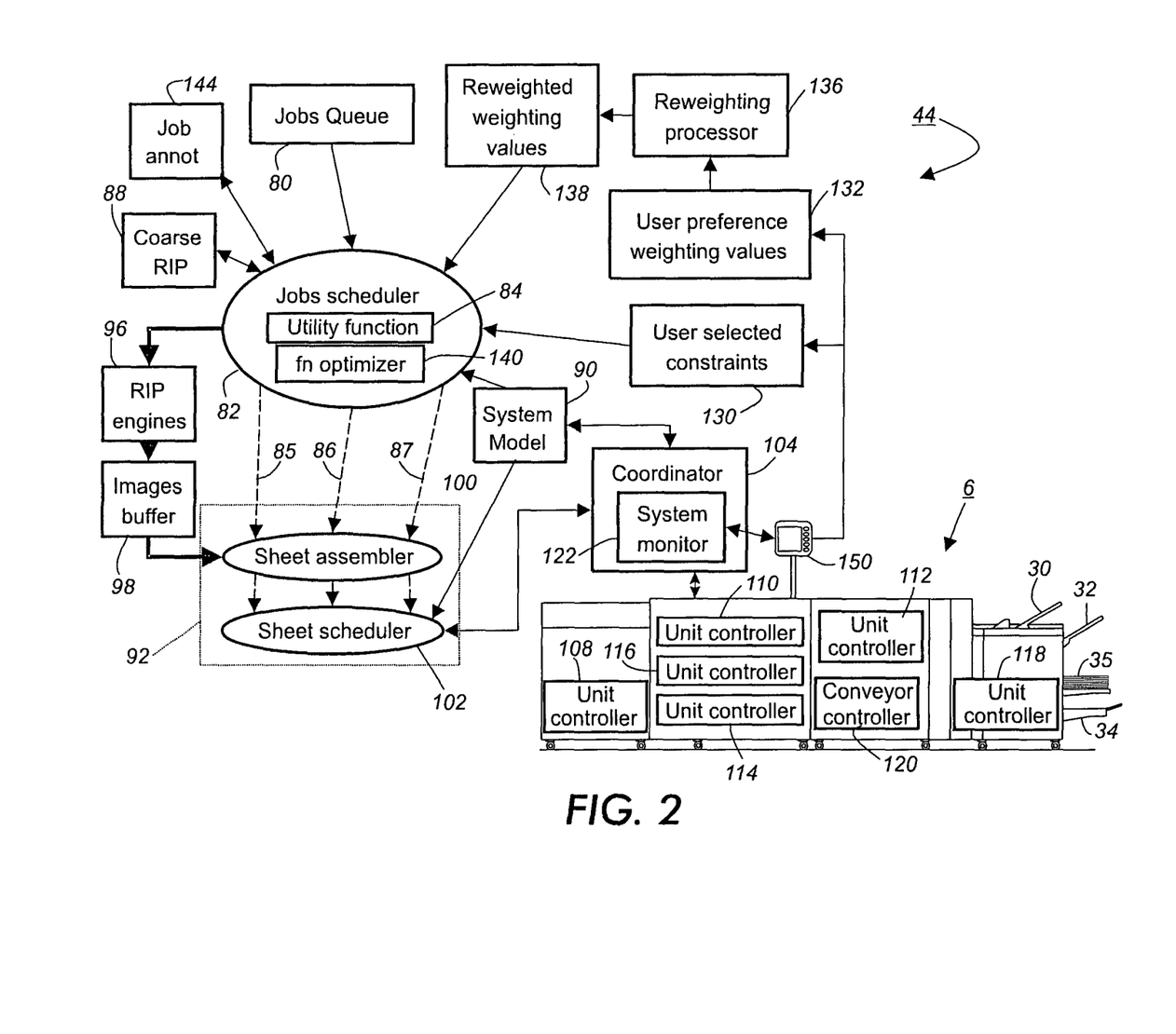
FIG. 2 diagrammatically illustrates the example printing system of FIG. 1 with system control aspects diagrammatically expanded.

With continuing reference to FIG. 1 and with further reference to FIG. 2, the printing controller 44 can include a jobs queue 80 that receives print jobs in the order they are sent to the parallel printing system 6. The number of jobs in the jobs queue 80 varies depending upon the load. At any given time, there may be zero, one, two, three, four, five, ten, fifteen, twenty, or more print jobs queued in the jobs queue 80. A jobs scheduler 82 schedules the print jobs based on a utility function 84 that takes advantage of the parallel sheet processing capabilities of the printing system 6. In order to assess properties of print jobs, a low resolution decomposition engine or coarse raster image processing (RIP) 88 or other previewer is suitably employed. The coarse RIP 88 can be used, for example, to determine the average coverage area of pages, the ratio of color to black-and-white pages or sheets, and so forth. It is to be appreciated that the low resolution decomposition 88 typically provides less than complete information about the print job. For example, it may provide statistical information about coverage for all the sheets of the job without providing the coverage of each sheet, or may provide a ratio of color images to black images for various sequences of consecutive pages, thereby indicating possible bottlenecks or slowdowns, including detailed information on which sheets contain color images, black images, or both color and black images, or so forth.

The printing system 6 can in general process multiple jobs concurrently or contemporaneously. Print jobs can be handled concurrently by interleaving sheets of different jobs through a single print engine. Print jobs can also be handled concurrently by parallel printing, in which different ones of the marking engines 10, 12, 14, 16 concurrently or contemporaneously mark sheets of different print jobs. In a printing system such as the printing system 6 that has more than one marking engine, jobs can also be processed concurrently using a combination of interleaving, batch printing, and parallel printing. When two or more print jobs are processed concurrently, each print job is sent to one or more print media destinations designated for that print job. If all of the sheets of a given print job are sent to the same print media destination, then fully automated collation can be performed. This is readily performed with the illustrated modular printing system 6, since the print media conveyor processing unit 20 can be controlled to deposit all sheets of a given print job in the same designated one of the print media destinations 30, 32, 34 and/or in a pre-print hopper 35 prior to deposit in the media destination. Alternatively, the sheets of a given print job can be sent to two or more different designated destinations, and then manually collated or collected. For example, in tandem or cluster printing, it may be advantageous to use two different marking engines each having its own destination for the same print job. In this case, however, the sheets at the two destinations will need to be manually collated or combined after the print job is complete.

To be described hereinafter, routing media directly to one of the media destinations, i.e. 34, and to the pre-print hopper 35 can eliminate the step of manually collating a completed print job, while, for example, the ratio of page types is not proportional to the productivity of the IME types.

In FIG. 2, three concurrent or contemporaneous job streams 85, 86, 87 can be processed concurrently or contemporaneously, corresponding to the three illustrated print media destinations 30, 32, 34. By having the number of concurrent or contemporaneous job streams 85, 86, 87 less than or equal to the number of print and pre-print media destinations 30, 32, 34 the printing system 6 can collect the sheets of each job stream at a single corresponding print media destination. As noted previously, the printing system 6 may include two, three, four, or more print media destinations, which may be trays, pans, hoppers, or so forth. Accordingly, the number of concurrent or contemporaneous job streams can be two, three, four, or more corresponding to the number of print media destinations or to some lower number of job streams. While there are efficiency advantages to having the number of job streams be less than or equal to the number of destinations, there is no pre-determined correlation between job stream and destination. In tandem and parallel printing (not illustrated), each of the sheet processing paths terminates in a different print media destination. Accordingly, in order to deliver all the sheets of a given print job to the same print media destination, each print job is suitably assigned to one of the sheet processing paths of the tandem or cluster printing system. Alternatively, if a given print job is divided amongst two or more of the sheet processing paths, manual collation will be required.

A first-in, first-out (FIFO) jobs processing schedule in which print jobs are processed in the order they are received may be undesirable, because the FIFO ordering may fail to take advantage of parallel printing capability. Moreover, the optimal choice of allocation of print jobs amongst the job streams may differ depending upon what objectives the user wishes to achieve, and the degree of importance the user places on each objective. For example, one job scheduling allocation may optimize productivity but produces poor image quality consistency since it involves using several different marking engines for a single print job. Another job scheduling allocation may produce good image quality consistency by matching up each print job with a single marking engine, but may introduce sheet processing bottlenecks that reduce productivity. A suitable function optimizer 140 optimizes the utility function 84 respective to the scheduling of print jobs to the job streams 85, 86, 87. In some embodiments, the function optimizer 140 computes a value for the utility function 84 for each possible schedule of print jobs to the plurality of job streams 85, 86, 87, and selects the schedule of print jobs that produces an optimal value of the utility function 84.

Accordingly, the jobs scheduler 82 can schedule the plurality of print jobs queued in the jobs queue 80 to the plurality of job streams 85, 86, 87 using the utility function 84 based on user selected parameters (i.e. dwell time) and a system model 90. Each of the processing units 8, 10, 12, 14, 16, 18, 20 can include its own corresponding unit controller 108, 110, 112, 114, 116, 118, 120 respectively. The unit controllers maintain a processing operation queue for corresponding processing units.

In particular, the scheduler will assess each job steam and determine potential bottlenecks. Bottlenecks will be exhibited when sequences of consecutive sheets within a job have page type distributions that are substantially different from, or not proportional to, the production rate of page types. For example, bottlenecks can result when system 6 is required to process a job stream 85 of 1440 pages having a requirement of 600 pages black only 85a, followed by 240 color prints 85b, and finally 600 pages of black only 85c. If the system capabilities or production rates of page types, for example, enable 400 ppm (using 2 black IMEs) and 60 ppm (using 2 color IMEs), a first bottleneck will result while idle color IMEs wait for the black IMEs to complete the 85*a*. A second bottleneck occurs when the black IMEs stop as the color IMEs complete the color prints in 85*b*. Printing of the color prints represents a four minute (240/60) system requirement or production dwell time.

Figure 3A:
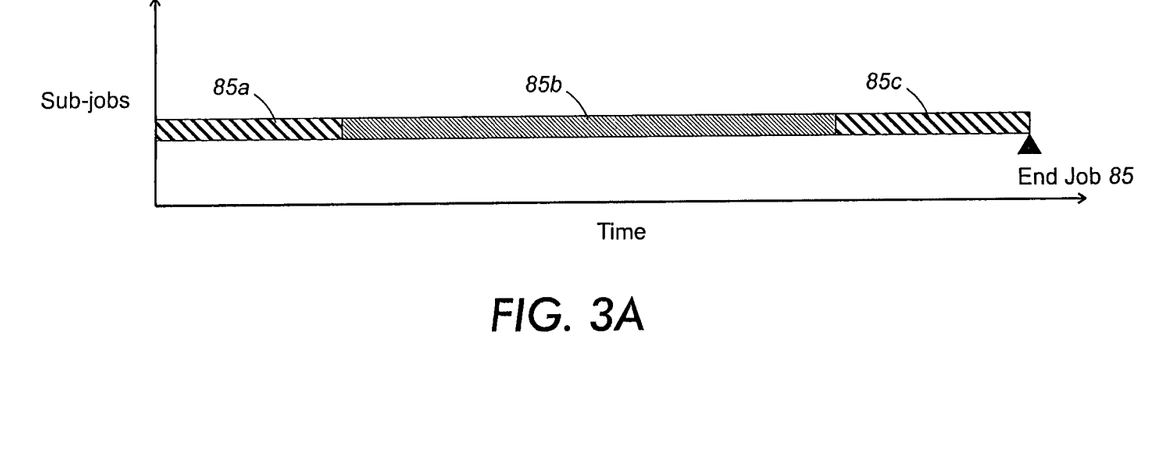
FIG. 3a is a schematic illustration of one type of print schedule (i.e. first in first out [FIFO]); and, FIG. 3b is a schematic illustration of another type of print schedule according to the disclosure.

If the color print type sub-job 85*b*, described above, is in the middle of the entire print job 85, one way to process the job while maintaining image quality consistency is a FIFO order (refer to FIG. 3*a*). In this manner, 600 pages can be processed using two of the IMEs at 400 ppm. Next the color pages can be processed using the color IMEs at 60 ppm. And finally the remaining 600 pages can be processed using again two of the IMEs. The resultant process or dwell time would be 1.5 min, 4.0 min, and 1.5 min, for 85*a*, 85*b*, and 85*c*, respectively. The total dwell time equates to 7.0 minutes. If image quality consistency is not critical and dwell time is to be minimized, another alternative to process job stream 85 is to process the first 600 pages using all four of the IMEs at 800 ppm. Next the color pages can be processed using the color IMEs at 60 ppm. And finally the remaining 600 pages can be processed again using all four of the IMEs at 800 ppm. The resultant process or dwell time would be 0.75 min, 4.0 min, and 0.75 min, for 85*a*, 85*b*, and 85*c*, respectively. The total dwell time equates to 5.50 minutes. In both scenarios, the pages are processed in order and can be delivered to a single destination without further collation.

Figure 3B:
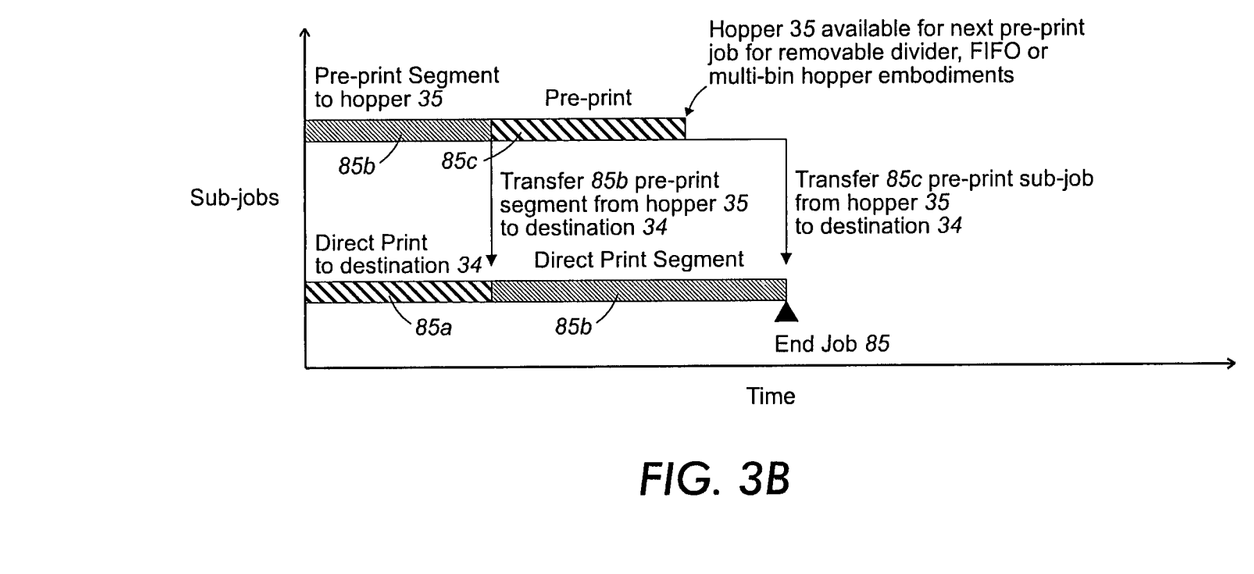

In reference now to FIG. 3*b*, wherein a job stream, i.e. 85, includes a ratio of page types disproportionate to the productivity of the IME types, another job schedule can be processed. The job stream 85 may be processed such that a first segment or sub-job 85*a* can be sent directly to destination 34, a second sub-job 85*b* contemporaneously processed with sub-job 85*a* can be sent to hopper 35 and/or directly to destination 34, and a third sub-job 85*c* sequentially processed with sub-job 85*a* and contemporaneously processed with sub-job 85*b* (or a portion thereof) can be sent to hopper 35 and/or directly to destination 34. As presented, the bottleneck (sub-job 85*b*) can be obviated by processing the job stream 85 in a manner as follows. The incoming job stream, i.e. 85, can be evaluated to identify a bottleneck (i.e. 240 consecutive pages of mostly color sheets, 85*b*). The sub-jobs can be segmented into direct-print and pre-print batches, or portions. The bottleneck portion of the job 85*b* can be scheduled to be printed in advance (pre-print) and sent to hopper 35. The pre-printed or advance printed sheets are preserved in a batch or packet in the sequence or sheet order of the sub-job segment. Concurrently with portion 85*b*, portion 85*a* can also be processed. The processing can include the two black only IMEs 10, 12 processing portion 85*a* and the other two color IMEs 14, 16 processing portion 85*b*. The first portion 85*a*, pages 1-600, can be processed and sent directly (direct print) to destination 34. After pages 1-600 are at destination 34, the pre-printed batch 85*b* (pages 601-840), or a portion thereof, can be 'dropped' or transferred in its entirety from hopper 35 onto the directly printed portion 85*a* into destination 34. Once hopper 35 is cleared, the third segment of the job 85*c* (pages 801-1440) can be processed and sent to hopper 35 while the remaining portion of 85*b* is processed and sent directly (direct print) to destination 34. After portion 85*b* is complete in destination 34, the third segment 85*c* can be transferred in its entirety from hopper 35 onto the first and second portions 85*a*, 85*b* in destination 34. It is to be appreciated that the resultant total process or dwell time would be 4.0 minutes because the first and third sub-jobs 85*a*, 85*c*, comprising 3 min. of dwell, are processed concurrently with sub-job 85*b*. It is further to be appreciated that by processing job stream 85 in this manner increases image quality consistency because only the black IMEs are processing the black pages, i.e. 1-600, and 801-1440. This method also eliminates the step of manually collating the different portions 85*a*, 85*b*, 85*c*. In some embodiments, the hopper 35 may have retractable dividers or sheet by sheet removal. Such hoppers can receive pages from a subsequent pre-print batch before the present pre-print is cleared. For example, a pre-print batch from job 86 could be sent to hopper 35 after the last page of 85*c* is received, but before hopper 35 is cleared. In yet another embodiment, hopper 35 may consist of multiple bins to allow the contemporaneous assembly of more than one pre-print batch.

Once the job scheduler 82 schedules print jobs queued in the jobs queue 80 to the plurality of sub-jobs 85*a*, 85*b*, 85*c* for job stream 85, one or more high resolution decomposition or raster image processing (RIP) engines 96 convert the first print sub-job scheduled for printing into printable images that are stored in an images buffer 98. As described, the first print sub-job scheduled or queued may correspond to the sub-job requiring the longest dwell (i.e. bottleneck) and may be scheduled for pre-print. The sheet itineraries processor 92 includes a sheet assembler 100 that assembles the printable images into sheet assembly trees or other data constructs representative of the printing operations to be performed on each sheet. A sheet scheduler 102 determines a sheet path for each sheet including information on which of the plurality of interconnected processing units 8, 10, 12, 14, 16, 18, 20 will perform which sheet processing tasks. For example, one possible sheet path in the system of FIG. 1 may use the upper path of the print media conveyor 20 and the marking engines 10, 12, while another possible sheet path may use the lower path of the print media conveyor 20 and marking engines 14, 16.

Both the job scheduler 82 and the sheet scheduler 102 make use of the system model 90. The system model 90 includes information on the capabilities of the processing units 8, 10, 12, 14, 16, 18, 20 of the printing system 6. For example, the system model 90 typically includes information on each of the installed marking engines 10, 12, 14, 16, such as the type of marking engine (color marking engine, black marking engine), the maximum sheet throughput rate of the marking engine, the types of print media compatible with the marking engine, the current state of the marking engine, and its range of available states, where these can be changed. For example, marking engines 10, 12 may be in a state for printing normal weight print media but can be changed to a state in which they can accept heavy weight paper with an appropriate time delay. The system model 90 may also include information on the types of print media available in print media source 8, and the characteristics of the finisher 18, such as capabilities for stapling, collating, staging, sequencing, hole-punching, binding, and the like, and other functional characteristics.

The utility function 84 is based on the system model 90, and is optimized using a constrained optimization limited by user-selected constraints 130 (or user preference weighting values 132) and by inherent constraints of the print jobs. A user selected constraint 130 can be input via an optional dedicated user interface 150 of the printing system 6. The optional dedicated user interface 150 can be used for other purposes, such as displaying the state of the printing system 6 as indicated by the system monitor 122. Optionally, a system monitor 122 monitors the printing system 6. The coordinator 104 can update the system model 90 responsive to the system monitor 122 indicating a change in the one or more monitored characteristics of the plurality of interconnected processing units 8, 10, 12, 14, 16, 18, 20. Some or all of the system monitor functions may also be performed by the unit controllers 108, 110, 112, 114, 116, 118, 120.

For example, user constraints may include a minimum productivity, a minimum image quality consistency, a min/max dwell time, or so forth. In some embodiments, a reweighting processor 136 adjusts the relative weightings of the user preferences to produce reweighted weighting values 138 expressed in monetary value or another selected common metric. The reweighting processor 136 may also reweight the user weightings to promote self-consistency. With reference to FIGS. 1 and 2, the user selected parameters 130, 132 can be supplied in various ways. For example, the user interface can include annotations 144 to the electronically supplied print job 42. Such annotated user preferences and constraints are typically applicable only to that print job 42 having the annotations 144. One example of an inherent print job constraint is a sheet ordering constraint that is typically implicit in a print job—the sheets of a document generally should be deposited in the print media destination in increasing or decreasing page number order, which heretofore had inherently constrained the order in which those sheets could be processed by the printing system 6. Another example of a print job constraint is to minimize the maximum dwell time of a job stream having varied consecutive page sequences with disproportionate page type distributions.

As a qualitative example, a minimum image quality consistency constraint can be set by a consistency mode setting that constrains the use of multiple marking engines within a single print job. If the minimum image quality consistency constraint is above a certain level for a particular print job, then it may be necessary for a single marking engine to be used to print all sheets of that print job so as to meet this high consistency constraint. On the other hand, if the minimum image quality consistency constraint is low for a particular print job, marking tasks for sheets of that print job are optionally divided up amongst two or more marking engines, since image quality inconsistencies between the two marking engines are tolerable. The job scheduler 82 can improve productivity by scheduling print jobs with low image quality consistency constraint values to concurrently executing sub-job streams, since the sheets of those sub-jobs can be staged or sequenced in the hopper 35 prior to transferring to a destination while maintaining sheet ordering and minimizing dwell time.

In some embodiments, the utility function 84 is a mathematical function or computational construct that embodies the dwell time of each sub-job. The sub-job with the longest dwell time can be processed first or concurrently with other sub-jobs. A given print sub-job has a minimum dwell time, defined as the fastest throughput for that print job assuming that all resources of the printing system 6 are dedicated to that print job. For example, in a print job that consists predominantly of black sheets but which also includes some color sheets, the minimum dwell time ($T_{dwell,min}$) is achieved by printing some of the black sheets using color marking engines. In some embodiments, a bottleneck will result when the dwell time of one of the sub-jobs exceeds or is of the general duration as the combined dwell times of all the other sub-jobs.

The disclosed jobs scheduling techniques are applicable to substantially any type of printing system or arrangement that provides concurrent sheet processing paths, including tandem printing systems, cluster printing systems, parallel printing systems, modular printing systems, and so forth.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A xerographic printing system comprising:
a plurality of interconnected processing units including one or more xerographic marking engines, the interconnected processing units defining a plurality of sheet processing paths terminating at a hopper and a print media destination;
a jobs scheduler scheduling print jobs non-sequentially in a first order to a plurality of concurrent sub-jobs of a continuous sequential job stream that corresponds to one print job using a utility function based on dwell time and a system model indicative of the plurality of interconnected processing units, the plurality of sub-jobs employing one or more of the plurality of sheet processing paths including at least one pre-print batch and at least one direct print batch;
a sheet itineraries processor that causes the plurality of interconnected processing units to concurrently move sheets of the concurrent sub-jobs along selected sheet processing paths to process the sheets and to independently deliver the at least one pre-print batch to the hopper and to sequentially deliver the at least one direct print batch to the destination wherein the at least one pre-print batch is collated in a second order with the at least one direct print batch;
the jobs scheduler comprises a function optimizer that compares the dwell time of each of the plurality of sub-jobs within the job stream; and,
wherein the function optimizer (i) compares the dwell time for each possible schedule of print sub-jobs to the plurality of sub-jobs and (ii) selects the schedule of pre-print sub-jobs and direct print sub-jobs that minimizes the overall dwell time of the job stream.

2. The printing system as set forth in claim 1, wherein the function optimizer selects and queues a first sub-job from the plurality of sub-jobs.

3. The printing system as set forth in claim 2, wherein the first queued sub-job is processed concurrently with another sub-job, wherein at least a portion of one of the first sub-job and the another sub-job is staged at the hopper.

4. The printing system as set forth in claim 1, further comprising user selected parameters for maintaining a job stream sequence, wherein the sheet processor transferring at least one pre-print batch in its entirety from the hopper to the destination.

5. The printing system as set forth in claim 1, wherein the plurality of interconnected processing units define one of:
a cluster printing system in which each of the plurality of sub-jobs processing paths terminates at a selected one of the hopper and the destination.

6. The printing system as set forth in claim 1, wherein a portion of a selected sub-job includes a pre-print batch and another portion of the selected sub-job includes a direct print batch.

7. A printing method comprising:
determining a plurality of sub-jobs within a continuous sequential job stream, each sub-job having a sequence of consecutive sheets as a portion of the continuous sequential job stream that corresponds to one print job, including a disproportionate page type and a dwell time;
maintaining a system model of a printing system including a plurality of interconnected processing units, the system model indicating characteristics of each processing unit;

scheduling the plurality of sub-jobs for processing in a first order into direct print and pre-print batches;

processing the direct print and pre-print batches using the plurality of interconnected processing units whereby at least one pre-print batch is staged in a hopper and at least one direct print batch is transported sequentially to a destination; and, sequencing the sub-jobs in a second order whereby the at least one pre-print batch from said hopper is transferred independently through the plurality of interconnected processing units in its entirety to the destination wherein the sub-jobs are collated with one another.

8. The printing method as set forth in claim 7, wherein the at least one pre-print batch is a portion of at least one of the sub-jobs.

9. The printing method as set forth in claim 7, further comprising processing at least another pre-print batch whereby the at least another pre-print batch is staged in the hopper and transferred independently through the plurality of interconnected processing units in its entirety to the destination.

10. The printing method as set forth in claim 7, wherein the dwell time of at least one of the sub-jobs is greater than the combined dwell time of the other sub-jobs.

11. The printing method as set forth in claim 7, wherein the sequencing of the sub-jobs includes transferring through the plurality of interconnected processing units at least another pre-print batch of another sub-job to the destination.

12. The printing method as set forth in claim 7, wherein at least one of the sub-jobs is processed as one of a pre-print batch and direct print batch.

13. The printing method as set forth in claim 7, wherein at least one of the sub-jobs is processed as both a pre-print batch and a direct print batch.

14. The printing method as set forth in claim 7, further comprising concurrently processing at least one pre-print batch of one sub-job and at least one direct print batch of another sub-job.

15. A printing method comprising:

determining a plurality of sub-jobs within a continuous sequential job stream, each sub-job having a sequence of consecutive sheets as a portion of the continuous sequential job stream corresponds to one print job, including a disproportionate page type and a dwell time;

maintaining a system model of a printing system including a plurality of interconnected processing units, the system model indicating characteristics of each processing unit;

comparing the dwell time of each of the plurality of sub-jobs;

scheduling the plurality of sub-jobs for processing in a first order into direct print and pre-print batches whereby the overall dwell time is minimized for the job stream;

processing the direct print and pre-print batches using the plurality of interconnected processing units whereby at least one pre-print batch is non-sequentially processed with at least another batch and, wherein the at least one pre-print batch is staged in a hopper and at least one direct print batch is transported to a destination; and, sequencing the sub-jobs in a second order whereby at least a selected one of the sub-jobs is processed as both a pre-print batch and a direct print batch.

16. The printing method as set forth in claim 15, wherein the pre-print batch for the selected one of the sub-jobs is transferred to the destination before the first page of the direct print batch of the selected one of the sub-jobs arrives at the destination.

17. The printing method as set forth in claim 15, further comprising processing at least another pre-print batch of another sub-job whereby the at least another pre-print batch is staged in the hopper and the at least another pre-print batch is transferred in its entirety to the destination.

18. The printing method as set forth in claim 15, wherein the dwell time of at least one of the sub-jobs is greater than the combined dwell time of the other sub-jobs.

19. The printing method as set forth in claim 15, wherein at least another one of the sub-jobs is processed as a pre-print batch.

* * * * *